United States Patent
Ikeda et al.

(10) Patent No.: US 9,433,927 B2
(45) Date of Patent: Sep. 6, 2016

(54) EXHAUST GAS PURIFICATION CATALYST AND EXHAUST GAS PURIFICATION METHOD USING SAID CATALYST

(71) Applicant: UMICORE SHOKUBAI JAPAN CO., LTD., Tokoname-shi, Aichi (JP)

(72) Inventors: Masanori Ikeda, Himeji (JP); Kazuyoshi Komata, Himeji (JP); Shigekazu Minami, Himeji (JP); Yuji Ogino, Himeji (JP); Hideki Goto, Himeji (JP)

(73) Assignee: UMICORE SHOKUBAI JAPAN CO., LTD., Aichi (JP)

(*) Notice: Subject to any disclaimer, the term of this patent is extended or adjusted under 35 U.S.C. 154(b) by 0 days.

(21) Appl. No.: 14/764,350

(22) PCT Filed: Jan. 31, 2014

(86) PCT No.: PCT/JP2014/052323
§ 371 (c)(1),
(2) Date: Jul. 29, 2015

(87) PCT Pub. No.: WO2014/119749
PCT Pub. Date: Aug. 7, 2014

(65) Prior Publication Data
US 2015/0367328 A1 Dec. 24, 2015

(30) Foreign Application Priority Data
Jan. 31, 2013 (JP) .................. 2013-017202

(51) Int. Cl.
*B01D 53/56* (2006.01)
*B01D 53/94* (2006.01)
(Continued)

(52) U.S. Cl.
CPC .............. *B01J 23/63* (2013.01); *B01D 53/945* (2013.01); *B01J 35/0006* (2013.01);
(Continued)

(58) Field of Classification Search
CPC ........ B01J 21/04; B01J 21/066; B01J 23/10; B01J 23/44; B01J 23/464; B01J 23/63; B01D 53/945

USPC ........ 502/302–304, 327, 332–334, 339, 349, 502/355, 439; 423/213.5
See application file for complete search history.

(56) References Cited

U.S. PATENT DOCUMENTS

| 4,153,579 A | 5/1979 | Summers et al. |
| 7,541,310 B2 * | 6/2009 | Espinoza ................ B01J 21/12 |
| | | 502/260 |

(Continued)

FOREIGN PATENT DOCUMENTS

| EP | 1 541 220 A1 | 6/2005 |
| JP | 54-107492 A | 8/1979 |

(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Aug. 13, 2015, in the corresponding International Application No. PCT/JP2014/052323. (10 pages).

(Continued)

*Primary Examiner* — Cam N. Nguyen
(74) *Attorney, Agent, or Firm* — Buchanan Ingersoll & Rooney PC (57) ABSTRACT

As a way to suppress deterioration of catalytic performance in an exhaust gas purification catalyst even after being exposed to an exhaust gas containing a phosphorus compound, an exhaust gas purification catalyst is provided. The catalyst purifies an exhaust gas containing a phosphorus compound, and the catalyst includes a catalyst layer containing rhodium (Rh), palladium (Pd), and either a ceria-zirconia-lanthana complex oxide or a ceria-zirconia-lanthana-yttria complex oxide as catalyst active components. Further, an average value of distances between Rh particles and the nearest Pd particles of the Rh and the Pd is within 4000 nm, a weight ratio of the Pd to the Rh is from 0.2 to 4.9, and a content rate of yttria in the ceria-zirconia-lanthana-yttria complex oxide is 19% by weight or less.

8 Claims, 1 Drawing Sheet

(51) Int. Cl.
*B01J 8/02* (2006.01)
*B01J 23/00* (2006.01)
*B01J 23/02* (2006.01)
*B01J 23/10* (2006.01)
*B01J 23/40* (2006.01)
*B01J 23/42* (2006.01)
*B01J 23/44* (2006.01)
*B01J 23/56* (2006.01)
*B01J 21/04* (2006.01)
*B01J 23/63* (2006.01)
*B01J 37/02* (2006.01)
*B01J 35/00* (2006.01)

(52) U.S. Cl.
CPC ... *B01J 37/0244* (2013.01); *B01D 2255/1023* (2013.01); *B01D 2255/1025* (2013.01); *B01D 2255/2061* (2013.01); *B01D 2255/2063* (2013.01); *B01D 2255/40* (2013.01); *B01D 2255/407* (2013.01); *B01D 2255/9022* (2013.01); *Y02T 10/22* (2013.01)

(56) References Cited

U.S. PATENT DOCUMENTS

| | | | | |
|---|---|---|---|---|
| 7,718,567 B2* | 5/2010 | Hanaki | ............... | B01D 53/945 502/100 |
| 7,776,783 B2* | 8/2010 | Takeshima | ........... | B01D 53/945 502/236 |
| 7,875,250 B2* | 1/2011 | Nunan | ................. | B01D 53/945 422/168 |
| 7,951,338 B2* | 5/2011 | Miyairi | ............. | B01D 46/2429 422/177 |
| 8,389,435 B2* | 3/2013 | Miura | ................. | B01D 53/945 423/213.2 |
| 8,455,390 B2* | 6/2013 | Kikuchi | .............. | B01D 53/945 502/240 |
| 8,465,711 B2* | 6/2013 | Ikeda | ................... | B01D 53/945 423/213.5 |
| 8,530,372 B2* | 9/2013 | Luo | ..................... | B01D 53/945 502/303 |
| 8,796,171 B2* | 8/2014 | Fujimura | ........... | B01D 53/9413 502/302 |
| 8,950,174 B2* | 2/2015 | Hilgendorff | ........ | B01D 53/945 423/213.2 |
| 2007/0179054 A1 | 8/2007 | Akamine et al. | | |
| 2010/0135879 A1 | 6/2010 | Roesch et al. | | |
| 2011/0237428 A1* | 9/2011 | Itou | .................... | B01D 53/9413 502/208 |
| 2012/0094827 A1* | 4/2012 | Matsueda | ........... | B01D 53/945 502/304 |
| 2012/0128558 A1* | 5/2012 | Nunan | ................ | B01D 53/945 423/213.5 |
| 2012/0142523 A1* | 6/2012 | Sato | ........................ | C01G 25/00 502/324 |
| 2013/0058848 A1* | 3/2013 | Nunan | ................. | B01D 53/945 423/213.5 |
| 2013/0336864 A1* | 12/2013 | Zheng | ..................... | B01J 23/63 423/213.5 |

FOREIGN PATENT DOCUMENTS

| | | |
|---|---|---|
| JP | 63-240946 A | 10/1988 |
| JP | 3-56137 A | 3/1991 |
| JP | 8-38898 A | 2/1996 |
| JP | 2007-203208 A | 8/2007 |
| JP | 2009-501079 A | 1/2009 |
| JP | 2010-521301 A | 6/2010 |
| WO | WO 2007/011498 A1 | 1/2007 |

OTHER PUBLICATIONS

International Search Report (PCT/ISA/210) mailed on Apr. 28, 2014, by the Japanese Patent Office as the International Searching Authority for International Application No. PCT/JP2014/052323.

Written Opinion (PCT/ISA/237) mailed on Apr. 28, 2014, by the Japanese Patent Office as the International Searching Authority for International Application No. PCT/JP2014/052323.

Culley, Scott A., et al., "The Impact of Passenger Car Motor Oil Phosphorus Levels on Automotive Emissions Control Systems", SAE Technical Paper Series, 961898, International Fall Fuels & Lubricants Meeting & Exhibition, 1996.

* cited by examiner

EXHAUST GAS PURIFICATION CATALYST AND EXHAUST GAS PURIFICATION METHOD USING SAID CATALYST

TECHNICAL FIELD

The present invention relates to a technique of purifying an exhaust gas of an internal combustion engine. More specifically, the invention relates to a technique of suppressing deterioration of catalytic performance due to long-term exposure to an exhaust gas containing a phosphorus compound.

BACKGROUND ART

According to tightening regulations on automobile emissions, there has been a demand for maintaining exhaust gas purification performance in an exhaust gas treatment device over a long time. This means that a demand for long service life of a catalyst as an aftertreatment device for exhaust gas purification has increased and also means that there has been a demand for improving long-term durability of a catalyst. In order to improve long-term durability of a catalyst, suppression of sintering of noble metal particles supported on a catalyst or suppression of sulfur poisoning has been studied. On the other hand, it is known that poisoning due to phosphorus contained in an exhaust gas (hereinafter, referred to as phosphorus poisoning) exerts a great influence on deterioration of catalytic performance (Non-Patent Literature 1). In order to meet regulations that will be tightened more and more from now, it is important to suppress the phosphorus poisoning or to maintain and improve the catalytic performance after phosphorus poisoning.

The phosphorus poisoning is known to be caused by accumulating or infiltrating, into a catalyst layer, a phosphorus compound derived from a lubricant additive, such as zinc dialkyl dithiophosphate, which is contained in an exhaust gas. It is known that occurrence of the phosphorus poisoning leads to deterioration of catalytic performance (Non-Patent Literature 1).

The catalytic performance deterioration due to the phosphorus poisoning is known to be caused by occurrence of phenomena as described below. Diffusional inhibition of the exhaust gas in the catalyst layer is caused by the phosphorus compound accumulated or infiltrated into the catalyst layer. In addition, cerium oxide of an oxygen-storage-release material that is widely used in a three-way catalyst and a phosphorus compound react to each other to form cerium phosphate. When cerium phosphate is formed, oxygen is difficult to be stored or released. Therefore, when atmosphere of the exhaust gas is fluctuated to be lean or rich, atmosphere fluctuation is less likely to be alleviated. According to occurrence of these phenomena, exhaust gas purification efficiency is deteriorated.

It is disclosed that, in a catalyst particularly using palladium in order to suppress phosphorus poisoning, performance deterioration can be alleviated by using a complex oxide of ceria and zirconia as an oxygen-storage-release material (Patent Literature 1).

Further, it is disclosed that performance deterioration due to phosphorus poisoning is suppressed by providing a region which is not washcoated as a phosphorus capture zone at a front end of a catalyst structure (Patent Literature 2).

CITATION LIST

Patent Literatures

Patent Literature 1: JP H8-38898 A
Patent Literature 2: JP 2009-501079 W (WO 2007/011498 A)

Non-Patent Literature

Non-Patent Literature 1: A. Scott et. al., SAE Paper, 96 1898, (1996)

SUMMARY OF INVENTION

Technical Problem

According to Patent Literature 1, it is disclosed that the catalytic performance deterioration after phosphorus poisoning endurance is suppressed in the case of using a ceria-zirconia complex oxide as an oxygen-storage-release material as compared with the case of using only ceria. However, suppressing effect thereof is not sufficient.

Further, since a large amount of the phosphorus compound adheres to an inflow side with respect to an exhaust gas flowing direction, it is considered that, in the catalyst according to Patent Literature 2, the catalytic performance deterioration can be suppressed by providing a portion on which a catalytic material is not coated at the inflow side. However, there is no description in Examples on the catalytic performance after the phosphorus poisoning, and a degree of the effect thereof is not clear. Further, depending on a traveling distance, the phosphorus compound adheres to the vicinity of a catalyst outlet at an outflow side and thus the catalytic performance is considered to be deteriorated. Therefore, it is hard to say that Patent Literature 2 proposes a sufficient countermeasure from the viewpoint of long-term durability.

Therefore, an object of the invention is to suppress deterioration of catalytic performance even after a catalyst is exposed to an exhaust gas containing a phosphorus compound for along time, and particularly, to suppress deterioration of catalytic performance of a rhodium-supporting catalyst having a high activity as a three-way catalyst.

Means for Solving Problem

The present inventors conducted intensive studies in order to solve the aforementioned problem, and as a result, they found that performance deterioration of rhodium can be suppressed even when a phosphorus compound in an exhaust gas is infiltrated into a catalyst layer by means of a catalyst in which a certain amount of palladium is disposed near rhodium and which uses a ceria-zirconia-lanthana complex oxide or a ceria-zirconia-lanthana-yttria complex oxide containing a certain amount or less of yttria. Therefore, the invention has been completed.

That is, according to the present invention, there is provided an exhaust gas purification catalyst purifying an exhaust gas containing a phosphorus compound, and the catalyst includes: a catalyst layer A containing rhodium (Rh), palladium (Pd), and either a ceria-zirconia-lanthana complex oxide or a ceria-zirconia-lanthana-yttria complex oxide as catalyst active components, wherein an average value of distances between Rh particles and the nearest Pd particles of the Rh and the Pd is within 4000 nm, a weight ratio of the Pd to the Rh is from 0.2 to 4.9, and a content rate of yttria in the ceria-zirconia-lanthana-yttria complex oxide is 19% by weight or less.

Advantageous Effect of the Invention

According to the invention, a high exhaust gas treatment performance can be maintained even after the catalyst of the invention is exposed to an exhaust gas containing a phosphorus compound for a long time.

DESCRIPTION OF EMBODIMENTS

An exhaust gas purification catalyst according to the invention is a catalyst purifying an exhaust gas containing a phosphorus compound, and the catalyst includes a catalyst layer A containing rhodium (Rh), palladium (Pd), and either a ceria-zirconia-lanthana complex oxide or a ceria-zirconia-lanthana-yttria complex oxide as catalyst active components. Further, the exhaust gas purification catalyst of the invention is characterized in that an average value of distances between Rh particles and the nearest Pd particles of the Rh and the Pd is within 4000 nm, a weight ratio of the Pd to the Rh is from 0.2 to 4.9, and a content rate of yttria in the ceria-zirconia-lanthana-yttria complex oxide is 19% by weight or less. The exhaust gas purification catalyst of the invention having such a configuration has excellent catalytic performance (poisoning resistance) even after the catalyst is exposed to an exhaust gas containing a phosphorus compound and excellent high-temperature endurance, and can efficiently purify an exhaust gas from an internal combustion engine, particularly, nitrogen oxide (NOx) or carbon monoxide (CO) in the exhaust gas. The reason why the exhaust gas purification catalyst of the invention exerts the effect as described above in this way is not clear, but the reason is inferred as follows. Incidentally, the invention is not intended to be limited to the following inference.

A gas at a rich side (excessive fuel) and a gas at a lean side (excessive air) in an air/fuel ratio flow into an exhaust gas purification catalyst for a gasoline vehicle. However, an activated metal such as rhodium is useful in purification of NOx at the rich side and in purification of CO and hydrocarbon (hereinafter, referred to as HC) at the lean side, and the purification of NOx and the purification of CO and HC are in a tradeoff relationship. For this reason, in order to efficiently purify all of NOx, CO, and HC, a method of introducing an exhaust gas having a theoretical air-fuel ratio of about 14.6 into a catalyst or a method of increasing the frequency of the theoretical air-fuel ratio is effective. However, during traveling, the burning behavior of the internal combustion engine varies depending on acceleration or deceleration, ambient temperature, humidity, and the like, and it is not possible to supply only the exhaust gas having a theoretical air-fuel ratio to the exhaust gas purification catalyst. When an oxygen-storage-release material in the catalyst stores oxygen at the lean side and releases oxygen at the rich side, various exhaust gas compositions can approximate the theoretical air-fuel ratio. That is, in order to increase the frequency of the theoretical air-fuel ratio, the oxygen-storage-release material is an essential material in the exhaust gas purification catalyst.

However, it is known that the oxygen-storage-release material forms cerium phosphate ($CePO_4$) when being exposed to an exhaust gas containing a phosphorus compound and thus does not function as an oxygen-storage-release material. Further, when the catalyst is exposed to the exhaust gas containing a phosphorus compound, the phosphorus compound is accumulated on a catalyst coating surface and infiltrated into the catalyst layer, and thus pores of a refractory inorganic oxide are blocked, thereby inhibiting gas diffusion. When the gas diffusion is inhibited, the exhaust gas does not reach Rh as an active component, and the like, and thus the exhaust gas purification performance is deteriorated.

Further, in a catalyst of the related art, as a general aspect of the accumulation and infiltration of the phosphorus compound, the phosphorus compound is accumulated and infiltrated from the surface of the catalyst layer toward a three-dimensional structure such that the concentration distribution thereof becomes lower as it approaches to the three-dimensional structure. In other words, the concentration of the phosphorus compound becomes higher toward the vicinity of the surface of the catalyst layer. The technique described in Patent Literature 2 described above focuses on the accumulation and infiltration of the phosphorus compound in the exhaust gas flowing direction. However, regarding a depth direction of the catalyst layer, in the same way as the case of Patent Literature 1 or the like, it is considered that the phosphorus compound exists such that the concentration thereof becomes higher toward the surface of the catalyst layer. In such an accumulation aspect, the gas diffusion toward the depth direction of the catalyst layer is inhibited due to the highly-concentrated phosphorus compound in the vicinity of the surface of the catalyst layer.

When a certain amount of palladium is disposed near rhodium within a certain distance, and a ceria-zirconia-lanthana complex oxide or a ceria-zirconia-lanthana-yttria complex oxide containing a certain amount or less of yttria is used, it is clear that a high resistance to such phosphorus poisoning is exhibited. Therefore, the invention has been completed.

Palladium has higher reactivity with phosphorus as compared with rhodium and is likely to form a phosphorus-palladium compound. From this reason, it is considered that the formation of a rhodium-phosphorus compound and cerium phosphate is suppressed when palladium near rhodium complements the phosphorus compound. Further, the ceria-zirconia-lanthana complex oxide is known to exhibit high crystal structure stability even after high-temperature endurance and the crystal structure stability thereof is further improved by further containing a certain amount or less of yttria. This high crystal structure stability is considered to suppress the formation of cerium phosphate. With such a configuration, in the catalyst of the invention, the inhibition of gas diffusion is suppressed in the vicinity of the surface of the catalyst layer in which the adherence of the phosphorus compound occurs at an early stage, and thus it is possible to continuously supply the exhaust gas in the depth direction of the catalyst layer over a long time as compared with the catalyst of the related art. For this reason, it is possible to decrease the concentration of the phosphorus compound on the surface of the catalyst layer and thus the phosphorus compound is dispersed well in the depth direction of the catalyst layer as compared with the related art. In addition, with such a configuration, it is considered that the concentration of the phosphorus compound near rhodium can be decreased. For this reason, although the accumulation amount of the phosphorus compound in the whole catalyst is not decreased, it is considered that the inhibition of gas diffusion is suppressed and thus high catalytic performance can be maintained.

Hereinafter, embodiments of the invention will be described. However, the invention is not intended to be limited to the following description. Incidentally, in this specification, the term "exhaust gas purification catalyst" is also simply referred to as the "catalyst" and the term "ceria-zirconia-lanthana complex oxide or ceria-zirconia-lanthana-yttria complex oxide" is also simply referred to as the "ceria-zirconia-lanthana (-yttria) complex oxide." Further, in this specification, the phosphorus compound indicates a compound containing phosphorus, such as $CePO_4$, $AlPO_4$, $Ca_3(PO_4)_2$, $Zn(PO_4)_2$, $CaZn_2(PO_4)_2$, or zinc dialkyl dithiophosphate, and there is no particular limitation on combination forms thereof.

Further, "A to B" in this specification means "A or more but B or less", and for example, the description "1% by weight to 30% by weight" or "1 to 30% by weight" in this specification indicates "1% by weight or more but 30% by weight or less." Furthermore, "C and/or D" in this specification means either or both of C and D. Moreover, each physical property exemplified in this specification means, although not specifically mentioned, a value as measured by a method described in Examples to be described later.

(I) Exhaust Gas Purification Catalyst

The catalyst of the invention is characterized by including a catalyst layer A which contains rhodium, palladium, and a ceria-zirconia-lanthana (-yttria) complex oxide which may contain a certain amount or less of yttria, and in which a certain amount of palladium is disposed near rhodium within a certain distance.

Here, in the catalyst, rhodium and palladium exist as a particle having an average particle diameter of 1 nm to 300 nm, and the average particle diameter of rhodium is preferably 1 nm to 50 nm, more preferably 2 nm to 30 nm, and most preferably 2 nm to 15 nm. When the average particle diameter thereof is 1 nm or more, it is possible to suppress an influence due to an interaction from the ceria-zirconia-lanthana (-yttria) complex oxide. Further, when the average particle diameter is 50 nm or less, the surface area of rhodium which can be brought into contact with an exhaust gas is not excessively decreased. Therefore, when the average particle diameter of rhodium is set to be within the above ranges, it is possible to sufficiently exert the catalytic performance. The average particle diameter of palladium is preferably 1 nm to 200 nm, more preferably 5 nm to 100 nm, and most preferably 5 nm to 50 nm. When the average particle diameter thereof is 1 nm or more, it is possible to suppress an influence due to an interaction from the ceria-zirconia-lanthana (-yttria) complex oxide. Further, when the average particle diameter is 200 nm or less, the surface area of palladium which can be brought into contact with an exhaust gas is not excessively decreased. Therefore, when the average particle diameter of palladium is set to be within the above ranges, it is possible to sufficiently exert the catalytic performance. The average particle diameters of rhodium and palladium are measured, for example, by a CO-pulse method.

Here, the description "disposed near rhodium within a certain distance" means that an average value of the nearest distances between the outer periphery of rhodium particles and the outer periphery of palladium particles (distances between Rh particles and the nearest Pd particles) is 0 to 4000 nm. The distance is preferably 0 to 300 nm, more preferably 0 to 200 nm, and most preferably 0 to 80 nm. When the palladium exists in a distance longer than 4000 nm, a palladium-phosphorus compound is formed not to have a relation with rhodium particles. Accordingly, a phosphorus poisoning suppressing effect of rhodium by palladium is not sufficient. On the other hand, the case of the distance of 0 nm means that rhodium particles and palladium particles are present in the same particle, and there are a case where an Rh—Pd alloy is formed and a case where rhodium particles and palladium particles are merely present in the same portion without forming an alloy. In this case, although an alloy may be formed or not formed, it is preferable that an alloy be formed.

The distances between palladium particles and rhodium particles are measured, for example, by EDS (energy dispersive spectroscopy) analysis using a scanning transmission electron microscopy. In this specification, an average value of distances between Rh particles and the nearest Pd particles is obtained as follows. One point at the outmost periphery of a Pd particle image existing in the shortest distance from one point at the outmost periphery of an Rh particle image determined from the EDS analysis is measured to obtain a distance between nearest particles of the Rh particle and the Pd particle. The same measurement is performed on 30 particles in total, and a value, which is obtained by calculating an average value of distances between nearest particles thus obtained, is employed.

When the catalyst active components are supported on a three-dimensional structure, the supported amount of rhodium is not particularly limited, but is preferably 0.001 to 1 g, and more preferably 0.1 to 0.5 g, in terms of Rh, per 1 liter (hereinafter, denoted as "L" in some cases) of the three-dimensional structure. Further, the supported amount of palladium in the catalyst layer A is preferably 0.2 to 4.9 times in weight, and more preferably 0.5 to 4 times in weight with respect to the Rh weight in the catalyst layer A.

In other words, when the supported amount of palladium is less than the above ranges, an effect of suppressing phosphorus poisoning may not be sufficient in some cases. On the other hand, when the supported amount thereof exceeds the amounts in the above ranges, cost performance may be deteriorated by using a large amount of an expensive noble metal and catalyst purification performance of rhodium may be impaired in some cases.

Further, the supported amount of palladium is preferably 0.05 to 20 g, and more preferably 0.1 to 10 g, in terms of Pd, per 1 L of the three-dimensional structure.

Further, other noble metals may be included into the catalyst active component, in addition to rhodium and palladium. Here, as other noble metals, platinum, iridium, and the like are exemplified, and platinum is preferably included. The other noble metals may be used in a form as they are, but it is preferable that the other noble metals be supported on a three-dimensional structure. When the catalyst active components are supported on a three-dimensional structure, the supported amount of platinum is not particularly limited, but is preferably 10 g or less, and more preferably 0.01 to 5 g, in terms of platinum, per 1 L of the three-dimensional structure. That is, when the supported amount of platinum is 10 g or less, exhaust gas purification efficiency is improved according to an introduced amount, and deterioration of the cost performance due to use of a large amount of an expensive noble metal can be prevented.

Further, the catalyst of the invention may include a catalyst layer B other than the catalyst layer A. At this time, the catalyst layer B is formed by coating as a lower layer and the catalyst layer A is formed by coating as a surface layer. Moreover, noble metals such as rhodium and palladium may be contained in the catalyst layer B. For example, the catalyst layer B containing palladium is coated as a lower layer, and the catalyst layer A is coated as a surface layer on the catalyst layer B. It is preferable that the catalyst layer A be the uppermost surface layer.

In the catalyst of the invention, when rhodium and palladium described above are supported on the same catalyst layer (the catalyst layer A) together with the ceria-zirconia-lanthana (-yttria) complex oxide, which may contain a certain amount or less of yttria, as an oxygen-storage-release material, exhaust gas purification performance is effectively exerted even in a state of adhesion of the phosphorus compound.

The content rate of yttria in the ceria-zirconia-lanthana (-yttria) complex oxide as an oxygen-storage-release material is 0 to 19% by weight, preferably 0 to 15% by weight, more preferably 2 to 15%, and most preferably 5 to 12% by weight. When the content rate of yttria exceeds 19% by weight, the crystal structure becomes strong. Therefore, oxygen release is less likely to occur and the catalytic performance is deteriorated. In addition, the content rate of ceria in the ceria-zirconia-lanthana (-yttria) complex oxide is preferably 5 to 96% by weight, more preferably 5 to 50% by weight, and most preferably 20 to 45% by weight.

Further, rare-earth metals other than cerium, lanthanum, and yttrium may be contained in the ceria-zirconia-lanthana (-yttria) complex oxide which may contain a certain amount or less of yttria. The rare-earth metals may be contained either in merely a physically mixed form or in a form of a complex oxide with cerium. Here, the rare-earth metals (excluding cerium and yttrium) may include neodymium (Nd), scandium (Sc), praseodymium (Pr), or the like and preferably include neodymium, praseodymium, or the like. Incidentally, the other rare-earth metals may be in a form of metal itself or in a form of an oxide. The content rate of the other rare-earth metals (excluding cerium, lanthanum, and yttrium) in the complex oxide is not particularly limited, but is preferably 0 to 20%, more preferably 0.5 to 15%, and most preferably 2 to 10%, in terms of an oxide.

It is preferable that rhodium and palladium as catalyst active components be supported on a three-dimensional structure together with the ceria-zirconia-lanthana (-yttria) complex oxide which may contain a certain amount or less of yttria and it is more preferable that rhodium and palladium be supported on a three-dimensional structure together with a refractory inorganic oxide, additionally. Incidentally, it is preferable that the refractory inorganic oxide be supported on a three-dimensional structure, but this does not mean that a case where rhodium and palladium as catalyst active components, and further other noble metals or the like are partially supported on the refractory inorganic oxide is excluded. For this reason, it is preferable that the catalyst of the invention further contain the refractory inorganic oxide, and in particular, it is preferable that the catalyst of the invention contain lanthanum-containing alumina ($Al_2O_3$—$La_2O_3$) from the viewpoint of improving heat resistance.

When the catalyst active components are supported on a three-dimensional structure, the content rate of the ceria-zirconia-lanthana (-yttria) complex oxide in the refractory inorganic oxide is not particularly limited, but is preferably 3 to 70% by weight, and more preferably 7 to 60% by weight. When the amount of the ceria-zirconia-lanthana (-yttria) complex oxide is 3% by weight or more, oxygen-storage-release performance is satisfactorily exerted and fluctuating atmosphere of the exhaust gas is effectively alleviated. On the other hand, when the amount thereof is 70% by weight or less, the amount of the refractory inorganic oxide, such as lanthanum-containing alumina, which is a base material of a noble metal as an active component is not relatively decreased too much and progression of sintering of the noble metal can be suppressed.

Incidentally, the term "sintering" described above means such a state that particles gather together into large blocks as being exposed to a high temperature. When metal particles such as rhodium as a catalyst active component cause sintering, surface areas of the metal particles are decreased and thus the catalyst activity is deteriorated, which is not favorable.

Any one which is generally used as a catalyst support may be used as the refractory inorganic oxide used in the invention other than the ceria-zirconia-lanthana (-yttria) complex oxide and the lanthanum-containing alumina described above. A known refractory inorganic oxide can be used, but an inorganic oxide having a melting point of 1000° C. or higher is preferably used. Inorganic oxides having a melting point of more preferably 1000 to 3000° C., and still more preferably 1500° C. to 3000° C. may be used. For example, α-alumina or an activated alumina such as γ-, δ-, η-, or θ-alumina, zeolite, titania, or zirconia, titania, and silicon oxide can be used. Further, these complex oxides, for example, alumina-titania, alumina-zirconia, or titania-zirconia can be used, but an activated alumina powder is preferable. Here, the refractory inorganic oxide may be blended singly or in a form of a mixture of two or more kinds. Although the refractory inorganic oxide may be used as it is, it is preferable that the refractory inorganic oxide be supported on a three-dimensional structure. When the refractory inorganic oxide is supported on a three-dimensional structure, the amount of the refractory inorganic oxide used is not particularly limited, but is generally 10 to 300 g, and preferably 50 to 200 g per 1 L of the three-dimensional structure. When the amount thereof is 10 g or more, it is possible to sufficiently disperse a noble metal and thus the sintering of the noble metal is suppressed. Therefore, sufficient durability can be obtained. On the other hand, when the amount thereof is 300 g or less, the thickness of the catalyst layer is not excessively increased and thus the contact state between the noble metal and the exhaust gas becomes favorable. Therefore, the catalytic performance can be sufficiently exerted.

The refractory inorganic oxide to be used in the invention can be in any shape, such as in a granule shape, a particulate shape, a powder shape, a cylindrical shape, a conical shape, a prismatic shape, a cubic shape, a pyramidal shape, and an irregular shape. A granule shape, a particulate shape, and a powder shape are preferable, and a powder shape is more preferable. When the refractory inorganic oxide is in a granule shape, a particulate shape, or a powder shape, the average primary particle diameter of the refractory inorganic oxide is not particularly limited, but for example, is in a range of 5 nm to 20 nm, and more preferably 5 nm to 10 nm. Within such a range, it is possible to support a noble metal on the refractory inorganic oxide. Incidentally, the shape or the average primary particle diameter of the refractory inorganic oxide in the invention can be measured by a known method such as a transmission electron microscope (TEM).

A BET specific surface area of the refractory inorganic oxide is not particularly limited, but is preferably 50 to 750 $m^2/g$, and more preferably 150 to 750 $m^2/g$, from the viewpoint of supporting a catalyst active component such as a noble metal.

The method of producing a catalyst of the invention is not particularly limited, and a known method can be used. Preferably, a method is exemplified which includes mixing the catalyst active components as described above in a form as they are, or in another appropriate form in an appropriate solvent to prepare a slurry, coating a three-dimensional structure with the slurry, and then drying and calcining the coated structure.

In the method described above, there is no particular limitation on a rhodium (Rh) source as a starting material, and raw materials used in the field of purification of an exhaust gas can be used. Specific examples thereof include rhodium; halides such as rhodium chloride; inorganic salts of rhodium, such as nitrate, sulfate, acetate, ammonium salt, amine salt, hexaammine salt, carbonate, bicarbonate, nitrite and oxalate; carboxylates such as formate; hydroxides; alkoxides; and oxides. Preferably, nitrate, ammonium salt, amine salt, and carbonate are exemplified. Among them, nitrate (rhodium nitrate), chloride (rhodium chloride), acetate (rhodium acetate), and hexaammine salt (hexaammine rhodium) are preferable, and rhodium nitrate is more preferable. Here, the amount of the rhodium source added is such an amount as to lead to the amount of rhodium supported on a three-dimensional structure as described above. Incidentally, in the invention, the rhodium sources described above may be used singly or as a mixture of two or more kinds.

Further, there is no particular limitation on a palladium (Pd) source as a starting material, and raw materials used in the field of purification of an exhaust gas can be used. Specific examples thereof include palladium; halides such as palladium chloride; inorganic salts of palladium, such as nitrate, sulfate, acetate, ammonium salt, amine salt, tetraammine salt, carbonate, bicarbonate, nitrite, and oxalate; carboxylates such as formate; hydroxide, alkoxide, and oxide. Preferably, nitrate, acetate, ammonium salt, amine salt, tetraammine salt, and carbonate are exemplified. Among them, nitrate (palladiumnitrate), chloride (palladium chloride), acetate (palladium acetate), tetraammine salt (tetraammine palladium) are preferable, and palladium nitrate is more preferable. Incidentally, in the invention, the palladium sources described above may be used singly or as a mixture of two or more kinds. Here, the amount of the palladium source added is such an amount as to lead to the amount of palladium supported on a three-dimensional structure as described above.

Further, in a case where platinum is contained as a catalyst active component, there is no particular limitation on a platinum (Pt) source as a starting material, and raw materials used in the field of purification of an exhaust gas can be used. Specific examples thereof include platinum; halides such as platinum bromide and platinum chloride; inorganic salts of platinum, such as nitrate, dinitrodianmine salt, tetraammine salt, sulfate, ammonium salt, amine salt, bisethanolamine salt, bisacetylacetonate salt, carbonate, bicarbonate, nitrite and oxalate; carboxylates such as formate; hydroxides; alkoxides; and oxides. Among them, nitrate (platinum nitrate), dinitrodianmine salt (dinitrodianmine platinum), chloride (platinum chloride), tetraammine salt (tetraammine platinum), bisethanolamine salt (bisethanolamine platinum), and bisacetylacetonate salt (platinum bisacetylacetonate) are preferable. Nitrate and dinitrodianmine salt are more preferable. Incidentally, in the invention, the platinum sources described above may be used singly or as a mixture of two or more kinds. Here, the amount of the platinum source added is such an amount as to lead to the amount of platinum supported on a three-dimensional structure as described above.

Further, there is no particular limitation on a ceria raw material ($CeO_2$ source) of the ceria-zirconia-lanthana (-yttria) complex oxide as a starting material, and raw materials used in the field of purification of an exhaust gas can be used. Specific examples thereof include nitrate such as cerous nitrate, carbonate, and sulfate. Among them, nitrate is preferably used. Incidentally, in the invention, the $CeO_2$ sources described above may be used singly or as a mixture of two or more kinds. Here, the amount of the $CeO_2$ source added is such an amount as to lead to the amount of ceria supported on a three-dimensional structure as described above.

Further, there is no particular limitation on a zirconia raw material ($ZrO_2$ source), and raw materials used in the field of purification of an exhaust gas can be used. Specific examples thereof include zirconium oxynitrate, zirconium oxychloride, zirconium nitrate, and basic zirconium sulfate. Among them, zirconium oxynitrate and zirconium nitrate are preferably used. Incidentally, in the invention, the $ZrO_2$ sources described above may be used singly or as a mixture of two or more kinds. Here, the amount of the $ZrO_2$ source added is such an amount as to lead to the amount of zirconia supported on a three-dimensional structure as described above.

Further, there is no particular limitation on a lanthana raw material ($La_2O_3$), and raw materials used in the field of purification of an exhaust gas can be used. Specific examples thereof include lanthanum hydroxide, lanthanum nitrate, lanthanum acetate, and lanthanum oxide. Among them, lanthanum nitrate or lanthanum hydroxide is preferable. The $La_2O_3$ sources described above may be used singly or as a mixture of two or more kinds. Here, the amount of the $La_2O_3$ source added is such an amount as to lead to the amount of lanthana supported on a three-dimensional structure as described above.

Further, there is no particular limitation on an yttria raw material ($Y_2O_3$ source), and raw materials used in the field of purification of an exhaust gas can be used. Specific examples thereof include yttrium hydroxide, yttrium nitrate, yttrium oxalate, and yttrium sulfate. Among them, yttrium hydroxide and yttrium nitrate are preferably used. Incidentally, in the invention, the Y sources described above may be used singly or as a mixture of two or more kinds. Here, the amount of the $Y_2O_3$ source added is such an amount as to lead to the amount of yttria supported on a three-dimensional structure as described above.

Further, in a case where the catalyst of the invention contains a refractory inorganic oxide, cerium, a ceria-zirconia complex oxide, a rare-earth metal, and an alkaline earth metal, each of these components as a starting material may be used in a form as it is, or in another form, but preferably used in a form as it is. The amount of each of the above-described component added is such an amount as to lead to the amount of the component supported on a three-dimensional structure as described above, or to the amount of the component existing in the catalyst as described above.

The catalyst active components as described above are mixed in an appropriate solvent to prepare a slurry. There is no particular limitation on a solvent to be used for preparing slurry. Any solvent used in the field of purification of an exhaust gas can be appropriately employed, but an aqueous medium is preferable. Examples of such an aqueous medium include water, lower alcohols such as ethanol and 2-propanol, and organic alkali aqueous solutions. Water and a lower alcohol are preferably used, and water is particularly preferably used. At this time, the concentration of the catalyst active component in the solvent is not particularly limited as long as a desired amount thereof can be supported on a three-dimensional structure. The amount thereof is such that the concentration of the catalyst active component in the solvent is preferably 20 to 60% by weight and more preferably 25 to 50% by weight. Further, after mixing the catalyst active component in the solvent, it is preferable that the mixture be wet-milled. At this time, a method of wet-milling is carried out generally according to a well-known method, and there is no particular limitation thereon. For example, wet-milling is carried out using a ball mill or the like.

Next, the catalyst of the invention can be prepared by coating the slurry as described above on a three-dimensional structure, followed by drying and calcining, so that the catalyst active components are supported on the three-dimensional structure.

There is no particular limitation on a three-dimensional structure that is covered by the catalyst active components, and materials generally used in the field of purification of an exhaust gas can be appropriately employed, but a refractory three-dimensional structure is preferable. Such a refractory three-dimensional structure (a refractory monolithic three-dimensional structure) may include a heat-resistant support such as a honeycomb support. A monolithically-fabricated honeycomb structure is preferable. Examples thereof include a monolithic honeycomb support, a metal honeycomb support, and a plug honeycomb support. Alternatively, a pellet support or the like can be used although it is not a monolithic three-dimensional structure.

As a monolithic support, generally, a so-called ceramic honeycomb support is acceptable. In particular, a honeycomb support using cordierite, silicon carbide, or silicon nitride as a raw material is preferable. Among them, a cordierite-based honeycomb support is particularly preferable. Alternatively, a monolithic structure formed using an oxidation-resistant heat-resistant metal such as stainless steel and a Fe—Cr—Al alloy may be used.

These monolithic supports can be produced by an extrusion molding method, a method of winding tightly a sheet-shaped element, or the like. The shape of a gas passing port (cell shape) may have any of hexagonal, rectangular, triangular, and corrugation shapes. In view of usability, the cell density (cell number/unit cross-sectional area) of 100 to 1200 cells/in$^2$ is satisfactory, and 200 to 900 cells/in$^2$ is preferable.

There is no particular limitation on drying and calcining conditions after coating on a three-dimensional structure, and conditions used in the field of purification of an exhaust gas can be appropriately employed. For example, after bringing (coating) a slurry into contact with a three-dimensional structure, the three-dimensional structure is pulled out from the slurry to remove excess slurry. After that, the structure is dried in air at a temperature of 50 to 300° C., preferably 80 to 200° C., for 5 minutes to 10 hours, preferably 30 minutes to 8 hours. Subsequently, the structure is calcined at a temperature of 300 to 1200° C., preferably 400 to 700° C., for 10 minutes to 10 hours, preferably 30 minutes to 5 hours.

Incidentally, in the method described above, the catalyst of the invention is produced by mixing desired catalyst active components to prepare a slurry, coating the slurry on a three-dimensional structure, and drying and calcining the structure. Alternatively, the catalyst of the invention may be produced as follows, for example. The catalyst of the invention may be produced by preparing two or more slurries of catalyst active components, sequentially coating each slurry on a three-dimensional structure, and drying and calcining the structure. In other words, one of the slurries of each catalyst active component described above is brought into contact with a three-dimensional structure support, and then dried in air at a temperature of 50 to 300° C., preferably 80 to 200° C., for 5 minutes to 10 hours, preferably 30 minutes to 8 hours. Subsequently, the structure is calcined at a temperature of 300 to 1200° C., preferably 400 to 700° C., for 10 minutes to 10 hours, preferably 30 minutes to 5 hours. According to this, a catalyst layer B that is a lower layer is formed. Then, another slurry of catalyst active components is similarly supported on a three-dimensional structure support, and further as necessary, still another slurry of catalyst active components is similarly supported on a three-dimensional structure support to form a catalyst layer A that is a surface layer, to yield a complete catalyst.

In the catalyst of the invention as described above or the catalyst produced by the method as described above, since a certain amount of palladium is disposed near rhodium within a certain distance and is supported on the ceria-zirconia-lanthana (-yttria) complex oxide which may contain a certain amount or less of yttria, high purification performance can be maintained for a long time even in a case where a phosphorus compound is contained in the exhaust gas. For this reason, the catalyst according to the invention can be preferably used in purifying an exhaust gas containing a phosphorus compound of an internal combustion engine.

Therefore, the invention is also to provide a method of purifying an exhaust gas, the method characterized by purifying an exhaust gas containing a phosphorus compound of an internal combustion engine by using the catalyst of the invention. The method includes a step of bringing the catalyst of the invention into contact with the exhaust gas containing a phosphorus compound of the internal combustion engine.

(II) Use Condition of Catalyst

After the exhaust gas purification catalyst of the invention is exposed to an exhaust gas having a temperature of 800° C. to 1200° C. of an internal combustion engine, it is preferable that rhodium particles be disposed near palladium particles and be supported on the ceria-zirconia-lanthana complex oxide which may contain a certain amount or less of yttria. That is, in this case, even when the catalyst is exposed to the highest temperature that the catalyst bed temperature may reach, since rhodium particles are disposed near palladium particles and are supported, NOx, CO, or HC in the exhaust gas can be purified even in a case where the catalyst is exposed to an exhaust gas containing a phosphorus compound. Therefore, even after exposure to a high-temperature exhaust gas, the exhaust gas containing a phosphorus compound can be efficiently purified by the exhaust gas purification catalyst of the invention.

(III) Exhaust Gas Purification Method

The catalyst of the invention as described above or the catalyst produced by the method as described above has high purification performance not only in a state where the phosphorus compound is not accumulated but also in a state where the phosphorus compound is accumulated as phosphorus oxide ($P_2O_5$) in an amount of preferably 1 g to 50 g, more preferably 1 g to 30 g, still more preferably 3 g to 15 g, and most preferably 5 g to 10 g per 1 L of the three-dimensional structure. The state where 1 g or more of the phosphorus compound is included is a state which may occur after a long period of use, and it is necessary to consider a case where 1 g or more of the phosphorus compound is included in order to improve long-term durability. On the other hand, a case where 50 g or more of the phosphorus compound is accumulated corresponds to malfunction in an oil system or engine combustion, and this is a state which may not occur in a normal driving. Accordingly, this state is not considered.

Further, when the catalyst is coated on a three-dimensional structure and used, in the catalyst of the related art, generally, the phosphorus compound is accumulated in a high concentration on the surface of the catalyst layer and the concentration distribution of the phosphorus compound at the inside of the catalyst layer in the depth direction is uneven. On the other hand, as compared with the catalyst of the related art, in the catalyst of the invention, the phosphorus compound is not intensively accumulated at the same portion but is dispersed in the catalyst layer. The concentration distribution of the phosphorus compound at the inside of the catalyst layer in the depth direction is obtained by analyzing a mapping image which is obtained by performing analysis in spectrums belonging to P (phosphorus) Kα ray according to EPMA (electron probe microanalyzer) analysis. When the mapping image is organized based on the X-ray intensity, in the catalyst of the related art, portions to which a highly-concentrated (high intensity) phosphorus compound adheres are detected much more than portions to which a lowly-concentrated (low intensity) phosphorus compound adheres. On the other hand, in the catalyst of the invention, portions to which a lowly-concentrated (low intensity) phosphorus compound adheres are detected much more than portions to which a highly-concentrated (high intensity) phosphorus compound adheres. More specifically, the catalyst of the invention is characterized in that, as described in Examples below, a cross-section at a detection portion in 0 to 10% of the maximum intensity of phosphorus Kα ray in EPMA (electron probe microanalyzer) analysis is larger than a cross-section at a detection portion in 10 to 54% thereof. Here, regarding the amount of the phosphorus compound contained in the catalyst as measured by XRF (X-ray fluorescence analysis), the related art and the invention is the same. According to this, it can be said that, in the catalyst of the invention, the phosphorus compound is infiltrated while being in a further dispersed state.

For this reason, the catalyst according to the invention can be preferably used in purifying the exhaust gas containing a phosphorus compound of the internal combustion engine, and in particular, exhibits an effect excellent in purification of nitrogen oxide, carbon monoxide, and hydrocarbon which are contained in an exhaust gas from an internal combustion engine such as a gasoline engine.

Therefore, the invention is also to provide a method of purifying an exhaust gas, the method characterized by purifying an exhaust gas using the exhaust gas purification catalyst described above. More specifically, the method of the invention is a method of purifying an exhaust gas, the method characterized by purifying nitrogen oxide, carbon monoxide, and hydrocarbon in an exhaust gas containing a phosphorus compound of an internal combustion engine by using the catalyst, that is, a method of purifying nitrogen oxide, carbon monoxide, and hydrocarbon in an exhaust gas by using the exhaust gas purification catalyst even when the accumulation amount of the phosphorus compound in the exhaust gas of the internal combustion engine is 1 g to 30 g per 1 L of the three-dimensional structure.

The method includes a step of exposing the catalyst of the invention to an exhaust gas containing a phosphorus compound of an internal combustion engine. Here, in this specification, the description "exposing to a gas" means that the exhaust gas purification catalyst is brought into contact with the gas, and includes not only a case where all of the surface of the catalyst is brought into contact with the gas but also a case where a part of the surface of the catalyst is brought into contact with the gas.

A method of exposing the exhaust gas purification catalyst to the exhaust gas is not particularly limited, and for example, the exhaust gas purification catalyst can be exposed to the exhaust gas in such a manner that the exhaust gas purification catalyst is placed in an exhaust gas path of an exhaust port of the internal combustion engine, and the exhaust gas is allowed to flow into the exhaust gas path.

The gas described above is not particularly limited as long as it is an exhaust gas of the internal combustion engine. Examples thereof include a nitrogen oxide (for example, NO, $NO_2$, or $N_2O$), carbon monoxide, carbon dioxide, oxygen, hydrogen, ammonia, water, sulfur dioxide, and various hydrocarbons.

The internal combustion engine is not particularly limited. For example, a gasoline engine, a hybrid engine, or an engine using a fuel such as natural gas, ethanol, or dimethyl ether can be used. Among them, a gasoline engine is preferably used as the internal combustion engine.

The time for exposing the exhaust gas purification catalyst to the exhaust gas is not particularly limited, but it is sufficient to secure a time for which at least part of the exhaust gas purification catalyst can be brought into contact with the exhaust gas.

The temperature of the exhaust gas is not particularly limited, but is preferably 0° C. to 800° C., that is, in a temperature range of the exhaust gas during normal driving. Here, an air/fuel ratio of the exhaust gas having a temperature of 0° C. to 800° C. of the internal combustion engine is 10 or more but less than 30, and preferably 11 to 14.7.

The catalyst of the invention as described above or the catalyst produced by the method as described above may be exposed to an exhaust gas having a temperature of 800 to 1200° C. Here, the air/fuel ratio of the exhaust gas having a temperature of 800 to 1200° C. is preferably 10 to 18.6. In addition, the time for exposing the exhaust gas purification catalyst to an oxygen-excess exhaust gas having a temperature of 800° C. to 1200° C. is not particularly limited, but for example, may be 5 to 500 hours.

Further, the temperature of a catalyst entry part in a case where a phosphorus compound adheres to the catalyst entry part is preferably 200° C. to 1200° C., and preferably 500° C. to 1000° C. The exhaust gas emitted from the internal combustion engine varies depending on a fuel, a lubricant, and a lubricant additive to be used, but a fuel, a lubricant, and a lubricant additive which are suitable for an MPI (multi-point injection) engine are preferably used.

Incidentally, it is preferable that the temperature of the exhaust gas be a temperature of the exhaust gas at the catalyst entry part. Here, the term "catalyst entry part" is a part of an exhaust pipe, which part has a space provided between an end face of the catalyst at an exhaust gas inflow side provided with the exhaust gas purification catalyst and a portion 20 cm away from the end face toward the internal combustion engine side, and at a center with respect to the vertical direction of the exhaust pipe. In addition, the term "catalyst bed part" is a part at a middle position between the end face at the exhaust gas inflow side and the other end face at an exhaust gas outflow side, and at the center with respect to the vertical direction of the exhaust pipe (in a case where the exhaust pipe has a shape other than a circular shape, the part is positioned at a center of gravity with respect to the cross-section in the vertical direction of the exhaust pipe).

Further, a similar or different exhaust gas purification catalyst may be disposed at the downstream (outflow side) of the catalyst of the invention, but since a larger amount of the phosphorus compound adheres to the upperstream than to the downstream, the catalyst of the invention is preferably disposed at the upperstream.

EXAMPLES

The effect of the invention will be described by means of the following Examples and Comparative Examples. However, the technical scope of the invention is not intended to be limited only to the following Examples. Incidentally, in this specification, exposing the catalyst to an exhaust gas containing a phosphorus compound is referred to as "phosphorus poisoning treatment" and exposing the catalyst to a high temperature of 800° C. to 1200° C. is referred to as "heat-resistant treatment."

Example 1

Formation of Catalyst Layer B

Each of an aqueous solution of palladium nitrate, a $CeO_2$—$ZrO_2$ complex oxide ($CeO_2$:$ZrO_2$=30:70, the same applying hereinafter), lanthanum-containing alumina ($Al_2O_3$—$La_2O_3$), and barium hydroxide was weighted such that a weight ratio of palladium (Pd):$CeO_2$—$ZrO_2$ complex oxide:$Al_2O_3$—$La_2O_3$:barium oxide (BaO) would be 3.625:60:30:10, and then was wet-milled in a ball mill, to prepare a slurry (a1). The prepared slurry (a1) was washcoated in an amount in which the total amount of each component described above was 103.625 g/L (hereinafter, a weight per 1 L of the cordierite support is denoted as g/L), on a 0.8 L cordierite support having a cell density of 600 cells/in$^2$ (the same applying hereinafter), dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:59:4:12, and $Al_2O_3$—$La_2O_3$ was weighted such that a weight ratio of rhodium (Rh):palladium (Pd):$CeO_2$—$ZrO_2$—$La_2O_3$—$Y_2O_3$ complex oxide:$Al_2O_3$—$La_2O_3$ would be 0.35:0.175:60:40, and then was wet-milled in a ball mill, to prepare a slurry (a2). The prepared slurry (a2) was washcoated in an amount in which the total amount of each component described above was 100.525 g/L, on the cordierite support which had been coated with the slurry (a1) in advance, dried at 150° C. for 15 minutes, and then calcined at 500° C. for 1 hour, to yield a catalyst A which was coated with 3.8 g/L of palladium and 0.35 g/L of rhodium.

Example 2

Formation of Catalyst Layer B

Each of an aqueous solution of palladium nitrate, a $CeO_2$—$ZrO_2$ complex oxide, $Al_2O_3$—$La_2O_3$, and barium hydroxide was weighted such that a weight ratio of palladium (Pd):$CeO_2$—$ZrO_2$ complex oxide:$Al_2O_3$—$La_2O_3$:BaO would be 3.36:60:30:10, and then was wet-milled in a ball mill, to prepare a slurry (b1). The prepared slurry (b1) was washcoated similarly in an amount of 103.36 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:59:4:12, and $Al_2O_3$—$La_2O_3$ was weighted such that a weight ratio of Rh:Pd:$CeO_2$—$ZrO_2$—$La_2O_3$—$Y_2O_3$ complex oxide:$Al_2O_3$—$La_2O_3$ would be 0.35:0.44:60:40, and then was wet-milled in a ball mill, to prepare a slurry (b2). The prepared slurry (b2) was washcoated in an amount of 100.79 g/L on the cordierite support which had been coated with the slurry (b1) in advance, dried at 150° C. for 15 minutes, and then calcined at 500° C. for 1 hour, to yield a catalyst B which was coated with 3.8 g/L of palladium and 0.35 g/L of rhodium.

Example 3

Formation of Catalyst Layer B

Each of an aqueous solution of palladium nitrate, a $CeO_2$—$ZrO_2$ complex oxide, $Al_2O_3$—$La_2O_3$, and barium hydroxide was weighted such that a weight ratio of palladium (Pd):$CeO_2$—$ZrO_2$ complex oxide:$Al_2O_3$—$La_2O_3$:BaO would be 2.925:60:30:10, and then was wet-milled in a ball mill, to prepare a slurry (c1). The prepared slurry (c1) was washcoated similarly in an amount of 102.925 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:59:4:12, and $Al_2O_3$—$La_2O_3$ was weighted such that a weight ratio of Rh:Pd:$CeO_2$—$ZrO_2$—$La_2O_3$—$Y_2O_3$ complex oxide:$Al_2O_3$—$La_2O_3$ would be 0.35:0.875:60:40, and then was wet-milled in a ball mill, to prepare a slurry (c2). The prepared slurry (c2) was washcoated in an amount of 101.225 g/L on the cordierite support which had been coated with the slurry (c1) in advance, dried at 150° C. for 15 minutes, and then calcined at 500° C. for 1 hour, to yield a catalyst C which was coated with 3.8 g/L of palladium and 0.35 g/L of rhodium.

Example 4

Formation of Catalyst Layer B

Each of an aqueous solution of palladium nitrate, a $CeO_2$—$ZrO_2$ complex oxide, $Al_2O_3$—$La_2O_3$, and barium hydroxide was weighted such that a weight ratio of palladium (Pd):$CeO_2$—$ZrO_2$ complex oxide:$Al_2O_3$—$La_2O_3$:BaO would be 2.4:60:30:10, and then was wet-milled in a ball mill, to prepare a slurry (d1). The prepared slurry (d1) was washcoated in an amount of 102.4 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:59:4:12, and $Al_2O_3$—$La_2O_3$ was weighted such that a weight ratio of Rh:Pd:$CeO_2$—$ZrO_2$—$La_2O_3$—$Y_2O_3$ complex oxide:$Al_2O_3$—$La_2O_3$ would be 0.35:1.4:60:40, and then was wet-milled in a ball mill, to prepare a slurry (d2). The prepared slurry (d2) was washcoated in an amount of 101.75 g/L on the cordierite support which had been coated with the slurry (d1) in advance, dried at 150° C. for 15 minutes, and then calcined at 500° C. for 1 hour, to yield a catalyst D which was coated with 3.8 g/L of palladium and 0.35 g/L of rhodium.

Comparative Example 1

Formation of Catalyst Layer B

Each of an aqueous solution of palladium nitrate, a $CeO_2$—$ZrO_2$ complex oxide, $Al_2O_3$—$La_2O_3$, and barium hydroxide was weighted such that a weight ratio of palladium (Pd):$CeO_2$—$ZrO_2$ complex oxide:$Al_2O_3$—$La_2O_3$:BaO would be 3.8:60:30:10, and then was wet-milled in a ball mill, to prepare a slurry (e1). The prepared slurry (e1) was washcoated in an amount of 103.8 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:59:4:12, and $Al_2O_3$—$La_2O_3$ was weighted such that a weight ratio of Rh:$CeO_2$—$ZrO_2$—$La_2O_3$—$Y_2O_3$ complex oxide:$Al_2O_3$—$La_2O_3$ would be 0.35:60:40, and then was wet-milled in a ball mill, to prepare a slurry (e2). The prepared slurry (e2) was washcoated in an amount of 100.385 g/L on the cordierite support which had been coated with the slurry (e1) in advance, dried at 150° C. for 15 minutes, and then calcined at 500° C. for 1 hour, to yield a catalyst E which was coated with 3.8 g/L of palladium and 0.35 g/L of rhodium.

Comparative Example 2

Formation of Catalyst Layer B

Each of an aqueous solution of palladium nitrate, a $CeO_2$—$ZrO_2$ complex oxide, $Al_2O_3$—$La_2O_3$, and barium hydroxide was weighted such that a weight ratio of palladium (Pd):$CeO_2$—$ZrO_2$ complex oxide:$Al_2O_3$—$La_2O_3$:BaO would be 3.765:60:30:10, and then was wet-milled in a ball mill, to prepare a slurry (f1). The prepared slurry (f1) was washcoated in an amount of 103.765 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:59:4:12, and $Al_2O_3$—$La_2O_3$ was weighted such that a weight ratio of Rh:Pd:$CeO_2$—$ZrO_2$—$La_2O_3$—$Y_2O_3$ complex oxide:$Al_2O_3$—$La_2O_3$ would be 0.35:0.035:60:40, and then was wet-milled in a ball mill, to prepare a slurry (f2). The prepared slurry (f2) was washcoated in an amount of 101.75 g/L on the cordierite support which had been coated with the slurry (f1) in advance, dried at 150° C. for 15 minutes, and then calcined at 500° C. for 1 hour, to yield a catalyst F which was coated with 3.8 g/L of palladium and 0.35 g/L of rhodium.

Comparative Example 3

Formation of Catalyst Layer B

Each of an aqueous solution of palladium nitrate, a $CeO_2$—$ZrO_2$ complex oxide, $Al_2O_3$—$La_2O_3$, and barium hydroxide was weighted such that a weight ratio of palladium (Pd):$CeO_2$—$ZrO_2$ complex oxide:$Al_2O_3$—$La_2O_3$:BaO would be 2.05:60:30:10, and then was wet-milled in a ball mill, to prepare a slurry (g1). The prepared slurry (g1) was washcoated in an amount of 102.05 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:59:4:12, and $Al_2O_3$—$La_2O_3$ was weighted such that a weight ratio of Rh:Pd:$CeO_2$—$ZrO_2$—$La_2O_3$—$Y_2O_3$ complex oxide:$Al_2O_3$—$La_2O_3$ would be 0.35:1.75:60:40, and then was wet-milled in a ball mill, to prepare a slurry (g2). The prepared slurry (g2) was washcoated in an amount of 102.1 g/L on the cordierite support which had been coated with the slurry (g1) in advance, dried at 150° C. for 15 minutes, and then calcined at 500° C. for 1 hour, to yield a catalyst G which was coated with 3.8 g/L of palladium and 0.35 g/L of rhodium.

Example 5

Formation of Catalyst Layer B

The slurry (b1) used in Example 2 was washcoated in an amount of 103.36 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:69:4:2 and $Al_2O_3$—$La_2O_3$ was weighted such that a weight ratio of Rh:Pd:$CeO_2$—$ZrO_2$—$La_2O_3$—$Y_2O_3$ complex oxide:$Al_2O_3$—$La_2O_3$ would be 0.35:0.44:60:40, and then was wet-milled in a ball mill, to prepare a slurry (h2). The prepared slurry (h2) was washcoated in an amount of 100.79 g/L on the cordierite support which had been coated with the slurry (b1) in advance, dried at 150° C. for 15 minutes, and then calcined at 500° C. for 1 hour, to yield a catalyst H which was coated with 3.8 g/L of palladium and 0.35 g/L of rhodium.

Example 6

Formation of Catalyst Layer B

The slurry (b1) used in Example 2 was washcoated in an amount of 103.36 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:66:4:5, and $Al_2O_3$—$La_2O_3$ was weighted such that a weight ratio of Rh:Pd:$CeO_2$—$ZrO_2$—$La_2O_3$—$Y_2O_3$ complex oxide:$Al_2O_3$—$La_2O_3$ would be 0.35:0.44:60:40, and then was wet-milled in a ball mill, to prepare a slurry (i2). The prepared slurry (i2) was washcoated in an amount of 100.79 g/L on the cordierite support which had been coated with the slurry (b1) in advance, dried at 150° C. for 15 minutes, and then calcined at 500° C. for 1 hour, to yield a catalyst I which was coated with 3.8 g/L of palladium and 0.35 g/L of rhodium.

Example 7

Formation of Catalyst Layer B

The slurry (b1) used in Example 2 was washcoated in an amount of 103.36 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:

$ZrO_2:La_2O_3:Y_2O_3=25:56:4:15$, and $Al_2O_3$—$La_2O_3$ was weighted such that a weight ratio of $Rh:Pd:CeO_2$—$ZrO_2$—$La_2O_3$—$Y_2O_3$ complex oxide:$Al_2O_3$—$La_2O_3$ would be 0.35:0.44:60:40, and then was wet-milled in a ball mill, to prepare a slurry (j2). The prepared slurry (j2) was washcoated in an amount of 100.79 g/L on the cordierite support which had been coated with the slurry (b1) in advance, dried at 150° C. for 15 minutes, and then calcined at 500° C. for 1 hour, to yield a catalyst J which was coated with 3.8 g/L of palladium and 0.35 g/L of rhodium.

Comparative Example 4

Formation of Catalyst Layer B

The slurry (b1) used in Example 2 was washcoated in an amount of 103.36 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2$:$La_2O_3$:$Y_2O_3$=25:51:4:20, and $Al_2O_3$—$La_2O_3$ was weighted such that a weight ratio of $Rh:Pd:CeO_2$—$ZrO_2$—$La_2O_3$—$Y_2O_3$ complex oxide:$Al_2O_3$—$La_2O_3$ would be 0.35:0.44:60:40, and then was wet-milled in a ball mill, to prepare a slurry (k2). The prepared slurry k2 was washcoated in an amount of 100.79 g/L on the cordierite support which had been coated with the slurry (b1) in advance, dried at 150° C. for 15 minutes, and then calcined at 500° C. for 1 hour, to yield a catalyst L which was coated with 3.8 g/L of palladium and 0.35 g/L of rhodium.

Comparative Example 5

Formation of Catalyst Layer B

The slurry (b1) used in Example 2 was washcoated in an amount of 103.36 g/L on a 0.8 L cordierite support, dried at 150° C. for 15 minutes, and then calcined at 500° C. for 1 hour.

(Formation of Catalyst Layer A)

Next, each of an aqueous solution of rhodium nitrate, an aqueous solution of palladium nitrate, a $CeO_2$—$ZrO_2$—$La_2O_3$—$Y_2O_3$ complex oxide formed at a ratio of $CeO_2$:$ZrO_2:La_2O_3:Y_2O_3=25:41:4:30$, and $Al_2O_3$—$La_2O_3$ was weighted such that a weight ratio of $Rh:Pd:CeO_2$—$ZrO_2$—$La_2O_3$—$Y_2O_3$ complex oxide:$Al_2O_3$—$La_2O_3$ would be 0.35:0.44:60:40, and then was wet-milled in a ball mill, to prepare a slurry (12). The prepared slurry 12 was washcoated in an amount of 100.79 g/L on the cordierite support which had been coated with the slurry (b1) in advance, dried at 150° C. for 15 minutes, and then calcined at 500° C. for 1 hour, to yield a catalyst L which was coated with 3.8 g/L of palladium and 0.35 g/L of rhodium.

<Heat-Resistant and Phosphorus Poisoning Treatment>

Each of the catalysts A to D and H to J obtained in Examples 1 to 7 and the catalysts E to G, K and L obtained in Comparative Examples 1 to 5 was disposed 25 cm downstream side from an exhaust port of a 3.0-liter V-type six-cylinder engine and subjected to heat-resistant and phosphorus poisoning treatment using an oil having a phosphorus (P) concentration of 3000 ppm in an engine oil. At this time, the temperature of the catalyst bed part was set to 1000° C. Further, the A/F of the catalyst entry part at the time of the heat-resistant and phosphorus poisoning treatment was set to 14.6, and a cycle in which the engine was operated for 25 seconds, and subsequently, the engine was operated for 3 seconds while the fuel supply was stopped was repeated and the operation was performed for 100 hours in total. It was checked that 7.4 g or more of the phosphorus compound per 1 L of the three-dimensional structure was contained as phosphorus oxide ($P_2O_5$) in the catalyst by analyzing the content of phosphorus in each catalyst endured in this way with XRF (X-ray fluorescence analysis).

<Distances Between Rh Particles and Nearest Pd Particles and Particle Diameters of Rh and Pd Particles>

After the heat-resistant treatment and the phosphorus poisoning treatment were performed on the catalysts A to D and H to J obtained in Examples 1 to 7 and the catalysts E to G, K and L obtained in Comparative Examples 1 to 5, distances between Rh particles and the nearest Pd particles were measured by TEM-EDS (transmission electron microscope-energy dispersive X-ray spectroscopy). The measurement results are presented in Table 1. Further, at this time, the particle diameter of each of particles in which Rh was detected by TEM-EDS analysis was 50 nm or less in all of the catalysts, and the particle diameter of each of particles in which Pd was detected was 200 nm or less in all of the catalysts.

TABLE 1

Phosphorus adhesion amount of each catalyst after phosphorus poisoning treatment

|  | Catalyst | Pd/Rh ratio in catalyst layer A | Weight % of $Y_2O_3$ in complex oxide in catalyst layer A | Average value of distances between Rh particles and nearest Pd particles | $P_2O_5$ detection amount after phosphorus poisoning treatment [g/L] |
|---|---|---|---|---|---|
| Example 1 | A | 0.5 | 12 | 77 nm | 9.7 |
| Example 2 | B | 1.25 | 12 | 56 nm | 7.4 |
| Example 3 | C | 2.5 | 12 | 45 nm | 8.0 |
| Example 4 | D | 4 | 12 | 43 nm | 8.1 |
| Comparative Example 1 | E | 0 | 12 | — | 8.2 |
| Comparative Example 2 | F | 0.1 | 12 | 334 nm | 8.0 |
| Comparative Example 3 | G | 5 | 12 | 26 nm | 8.5 |
| Example 5 | H | 1.25 | 2 | 52 nm | 9.0 |
| Example 6 | I | 1.25 | 5 | 68 nm | 8.5 |
| Example 7 | J | 1.25 | 15 | 48 nm | 8.6 |

TABLE 1-continued

Phosphorus adhesion amount of each catalyst after phosphorus poisoning treatment

| | Catalyst | Pd/Rh ratio in catalyst layer A | Weight % of $Y_2O_3$ in complex oxide in catalyst layer A | Average value of distances between Rh particles and nearest Pd particles | $P_2O_5$ detection amount after phosphorus poisoning treatment [g/L] |
|---|---|---|---|---|---|
| Comparative Example 4 | K | 1.25 | 20 | 63 nm | 7.9 |
| Comparative Example 5 | L | 1.25 | 30 | 61 nm | 8.2 |

<EPMA Image after Phosphorus Poisoning Treatment>

Figure 1:
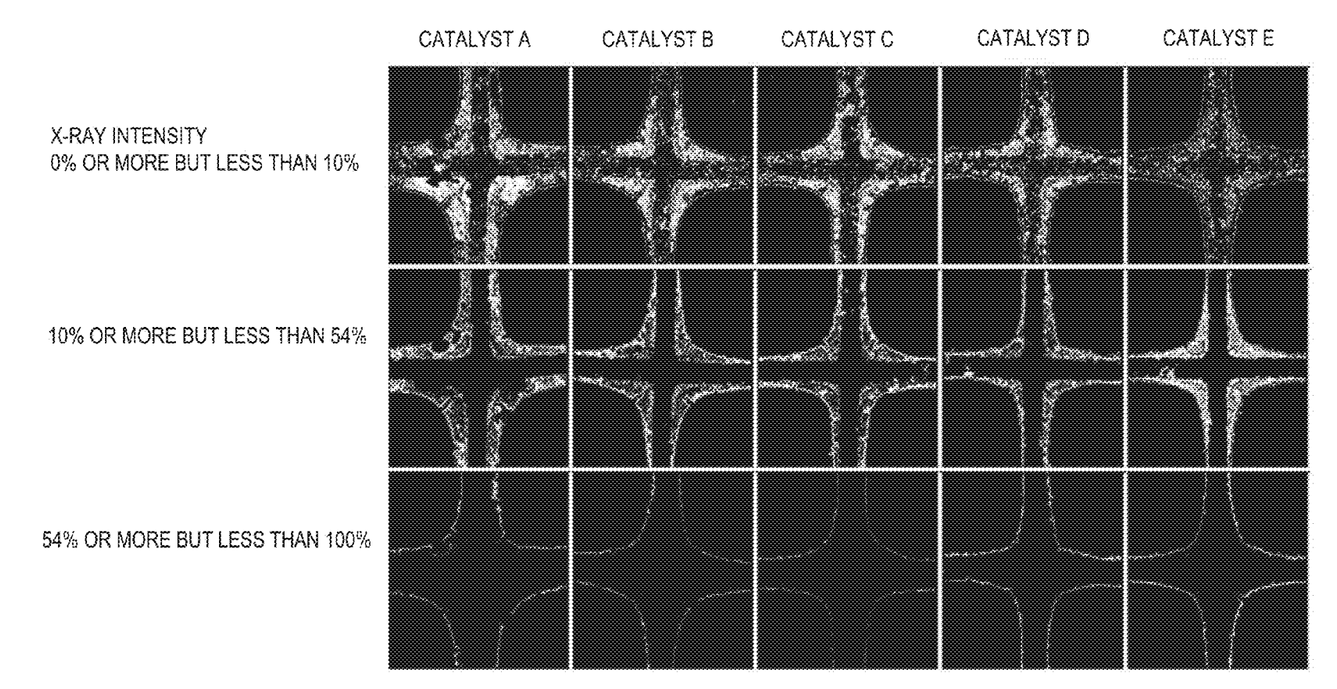
FIG. 1 shows EPMA images in which phosphorus Kα ray intensities in a catalyst layer after phosphorus poisoning treatment are compared.

FIG. 1 shows EPMA images in which the catalysts A to E that have been subjected to the phosphorus poisoning treatment are classified into 0 to 10%, 10% to 54%, and 54% to 100% of the maximum intensities in the phosphorus Kα ray. From this drawing, it is found that the catalysts A to D of Examples are different from the catalyst E of Comparative Example and portions of 0 to 10% are more than portions of 10 to 54%. From the fact that the adherent amount of the phosphorus compound in all of the catalysts is the same (Table 1), the results in FIG. 1 show that a portion where a lowly-concentrated phosphorus compound is present is widely present in the catalyst layer of the catalysts of Examples as compared with the catalyst of Comparative Example. This means that the phosphorus compound in the catalyst layer is more dispersed in the catalysts of Examples as compared with the catalyst of Comparative Example.

<Performance Evaluation of Exhaust Gas Purification Catalyst>

Each of the catalysts which had been subjected to the heat-resistant treatment before and after the phosphorus poisoning was disposed 30 cm downstream side from an exhaust port of a 2.0-liter straight-six-cylinder engine, the temperature of the catalyst bed part was increased at a rate of 50° C./min while an A/F was set to 14.6 and was changed at an A/F amplitude of ±0.5 and at a frequency of 0.5 Hz, the gas emitted from a catalyst outlet was sampled, and each of the purification efficiency of CO, THC, and NOx was calculated. The temperature at which each purification efficiency reaches 50% is denoted as T50, and the results are presented in Table 2. As T50 after the phosphorus poisoning treatment is lower, higher exhaust gas purification performance is exhibited even after the phosphorus poisoning treatment. Further, ΔT50 was calculated by subtracting T50 before the phosphorus poisoning (after heat endurance) from T50 after the phosphorus poisoning. It can be said that, as this ΔT50 is smaller, the catalytic performance is also not deteriorated by the phosphorus poisoning treatment. Moreover, it can be said that, in a catalyst having a low ΔT50 but a high T50, the catalytic performance at the initial stage or before the phosphorus poisoning treatment is low. Therefore, a catalyst having a low ΔT50 and a low T50 is preferable.

From the results of Table 2, it is found that, in the catalysts of Examples of the invention, T50 after the phosphorus poisoning treatment is low and ΔT50 also is low. This means that the catalyst of the invention exhibits high catalytic performance even in a state where the phosphorus compound adheres.

TABLE 2

Evaluation results of engines on test bench

| | After heat-resistance treatment [° C.] | | | After phosphorus poisoning treatment [° C.] | | | ΔT50 before and after phosphorus poisoning treatment [° C.] | | |
|---|---|---|---|---|---|---|---|---|---|
| Catalyst | CO | THC | NOx | CO | THC | NOx | CO | THC | NOx |
| A | 289 | 298 | 290 | 294 | 303 | 295 | 5 | 5 | 5 |
| B | 287 | 297 | 290 | 293 | 300 | 294 | 6 | 3 | 4 |
| C | 296 | 303 | 300 | 296 | 304 | 300 | 0 | 1 | 0 |
| D | 298 | 295 | 303 | 300 | 298 | 304 | 2 | 3 | 1 |
| E | 287 | 300 | 290 | 301 | 313 | 312 | 14 | 13 | 22 |
| F | 287 | 299 | 290 | 299 | 308 | 310 | 12 | 9 | 20 |
| G | 294 | 292 | 306 | 309 | 314 | 322 | 15 | 22 | 16 |
| H | 284 | 296 | 286 | 292 | 303 | 293 | 8 | 7 | 7 |
| I | 285 | 295 | 287 | 291 | 300 | 292 | 6 | 5 | 5 |
| J | 291 | 298 | 291 | 296 | 302 | 295 | 5 | 4 | 4 |
| K | 305 | 308 | 311 | 308 | 309 | 313 | 3 | 1 | 2 |
| L | 313 | 319 | 315 | 322 | 318 | 317 | 2 | 3 | 2 |

Incidentally, the present application is based on Japanese Patent Application No. 2013-017202 filed on Jan. 31, 2013, and the disclosure of which is herein incorporated by reference in its entirety.

The invention claimed is:

1. An exhaust gas purification catalyst for purifying an exhaust gas containing a phosphorus compound, the catalyst comprising:
   a catalyst layer A containing rhodium (Rh), palladium (Pd), and either a ceria-zirconia-lanthana complex oxide or a ceria-zirconia-lanthana-yttria complex oxide as catalyst active components,
   wherein an average value of distances between Rh particles and the nearest Pd particles of the Rh and the Pd is within 4000 nm,
   a weight ratio of the Pd to the Rh is from 0.2 to 4.9, and
   a content rate of yttria in the ceria-zirconia-lanthana-yttria complex oxide is 19% by weight or less.

2. The exhaust gas purification catalyst according to claim 1, further comprising lanthanum-containing alumina.

3. The exhaust gas purification catalyst according to claim 1, further comprising:
   a catalyst layer B,
   wherein the catalyst layer B comprises at least one novel metal selected from the group consisting of rhodium and palladium as an essential component, which is formed by coating as a lower layer, and the catalyst layer A is formed by coating as a surface layer.

4. The exhaust gas purification catalyst according to claim 3, wherein the catalyst layer B further comprises $CeO_2$—$ZrO_2$ complex oxide and a lanthanum containing alumina.

5. The exhaust gas purification catalyst according to claim 1, comprising a phosphorus compound.

6. The exhaust gas purification catalyst according to claim 5, wherein a cross-section at a detection portion in 0 to 10% of the maximum intensity of phosphorus Kα ray in EPMA (electron probe microanalyzer) analysis is larger than a cross-section at a detection portion in 10 to 54% thereof.

7. The exhaust gas purification catalyst according to claim 1,
   wherein the catalyst active components are supported on a three-dimensional structure, and
   the phosphorus compound is contained as phosphorus oxide in an amount of 1 to 50 g per 1 L of the three-dimensional structure.

8. A method of purifying an exhaust gas, the method comprising purifying an exhaust gas using the exhaust gas purification catalyst according to claim 1.

* * * * *